United States Patent
Kuo et al.

(10) Patent No.: US 6,766,391 B2
(45) Date of Patent: Jul. 20, 2004

(54) EMBEDDED CONTROL UNIT

(75) Inventors: Hubert Kuo, Taipei (TW); I-Ming Lin, Taipei (TW)

(73) Assignee: Via Technologies Inc., Taipei (TW)

( * ) Notice: Subject to any disclaimer, the term of this patent is extended or adjusted under 35 U.S.C. 154(b) by 0 days.

(21) Appl. No.: 10/392,027

(22) Filed: Mar. 18, 2003

(65) Prior Publication Data

US 2003/0182476 A1 Sep. 25, 2003

(30) Foreign Application Priority Data

Mar. 20, 2002 (TW) ........................................ 91105310 A

(51) Int. Cl.[7] .............................................. G06F 13/00
(52) U.S. Cl. ............................ 710/62; 710/72; 710/305
(58) Field of Search ............................ 710/1–14, 62–64, 710/72–74, 300, 305–306

(56) References Cited

U.S. PATENT DOCUMENTS

| | | | | |
|---|---|---|---|---|
| 5,826,105 A | * | 10/1998 | Burstein et al. | 710/22 |
| 5,978,862 A | | 11/1999 | Kou et al. | 710/14 |
| 6,094,700 A | * | 7/2000 | Deschepper et al. | 710/313 |
| 6,154,832 A | * | 11/2000 | Maupin | 712/228 |
| 6,259,172 B1 | * | 7/2001 | Lee | 307/125 |
| 6,438,640 B1 | * | 8/2002 | Miyamoto et al. | 710/303 |
| 6,493,783 B1 | * | 12/2002 | Kinoshita et al. | 710/303 |
| 6,516,374 B1 | * | 2/2003 | Kinoshita et al. | 710/304 |
| 6,633,930 B2 | * | 10/2003 | Sonehara et al. | 710/62 |
| 6,654,890 B1 | * | 11/2003 | Girard | 713/200 |
| 6,664,764 B1 | * | 12/2003 | Odaohhara | 320/132 |

* cited by examiner

*Primary Examiner*—Christopher B. Shin
(74) *Attorney, Agent, or Firm*—Thomas, Kayden, Horstemeyer & Risley

(57) ABSTRACT

An embedded control unit is installed in a notebook computer, so as to take the place of the programmable processor in many conventional notebook computers for controlling peripheral devices. The embedded control unit includes a plurality of peripheral controllers, so as to control the peripheral devices usually used by typical notebook computers. The peripheral controllers can be directly connected to the peripheral devices, according to the specifications for different types and/or brands of notebook computers. In addition, the peripheral controllers can achieve control of the peripheral devices according to the non-adjustable internal register settings. In this way, the control of the peripheral devices can be achieved without using firmware, thereby simplifying the notebook computer development process and reducing the development cost.

18 Claims, 7 Drawing Sheets

EMBEDDED CONTROL UNIT

This application claims the benefit of Taiwan application Serial No. 091105310, filed on Mar. 20, 2002.

BACKGROUND OF THE INVENTION

1. Field of the Invention

This invention in general relates to an embedded controller for controlling different programmable peripheral devices, and more particularly to an embedded control unit suitable for use in a notebook computer, which can be further integrated into a south bridge chipset by using the embedded control unit's register-transistor-level (RTL) description after complete verification.

2. Description of the Related Art

Nowadays, the personal computer industry has reached maturity. Many computer components have already been standardized, resulting in the reduction in design difficulties. FIG. 1 schematically shows the structure of a typical desktop computer system. The desktop computer system includes a central processing unit 102, a north bridge chipset 104 and a south bridge chipset 106. In general, the south bridge chipset is also called the input/output (I/O) controller, which can be connected to many external peripheral devices. For example, an external keyboard 122 is coupled to the south bridge chipset 106, so as to receive user's input data. Likewise, desktop computers are standardized so that the users can conveniently add other peripheral devices to the desktop computers. Different notebook computer manufacturers, on the other hand, implement respective circuit designs of their products in the form of a single main board, in order to make a breakthrough in the limitations on design specification, such as height, weight, and power consumption. In addition, the developers particularly add special functions related to various applications and peripheral devices to their products in order to provide some distinguishable product characteristics that are for the convenience of the users. For example, a dedicated e-mail indicator is provided to notify the user of the reception of e-mail as the indicator is on when an e-mail is received. In addition, dedicated keys are provided for the user to launch applications for various functions such as navigating the Internet, sending/receiving e-mails, or playing songs from a CD. Further, the special functions can be a special power saving mode, a special touch-sensitive pad support, reading battery capacitor and controlling the battery, special heat dissipation design, and so on. Such special functions are conventionally implemented by using an embedded controller (EC) including a microcontroller and a non-volatile memory, wherein the non-volatile memory can also be made either internally or externally. The design approach to the special functions is sufficient for the notebook PC designers to modify their programs flexibly. In order to design various special functions, the notebook PC manufacturers have to nurture hardware and software engineers. Unfortunately, such design approach thus increases the entire product complexity, the period for developing and testing firmware as well as hardware costs.

A conventional embedded control IC, which is employed in the structure of a typical notebook computer system, is illustrated in FIG. 2. The notebook computer includes a central processing unit 102, a north bridge chipset 104, a south bridge chipset 106, and an embedded control IC 208, wherein a number of built-in peripheral devices are controlled by the embedded controller IC 208. These built-in peripheral devices include, for example, a touch pad 210, an LED indicator 212, a fan 214, a battery 216, a built-in keyboard 218, and an optical disk drive 220. External peripheral devices such as an external keyboard 122 can also be connected to the notebook computer via a connection with the south bridge chipset 106. The LED indicator 212, for example, can be used as an e-mail indicator, a battery status indicator, or a hibernation mode indicator. The internal circuit of the embedded controller IC 208 includes a microcontroller. The embedded controller IC 208 is connected to the south bridge chipset 106 via a low pin count (LPC) cable.

SUMMARY OF THE INVENTION

It is therefore an objective of the invention to provide an embedded control unit capable of flexibly controlling different peripheral devices without programming firmware.

The invention achieves the above-identified objects by providing an embedded control unit, installed in a computer, to control a plurality of peripheral devices. The embedded control unit includes a plurality of peripheral controllers for controlling the peripheral devices, wherein each peripheral controllers can be enabled according to a selection signal. In addition, the embedded control unit includes a plurality of built-in register group sets for fine adjustment in the peripheral devices' control so as to be compliant with different product brands and different specifications. The invention enables the design and development of notebook computers to reach the same maturity levels as the desktop computer shown in FIG. 1. It can also reduce the technology threshold that the downstream manufacturers have to cross so that the downstream manufacturers can produce their products more efficiently with the embedded control unit as well as making customization.

In other words, the invention is to provide an embedded control unit, to be installed in a notebook computer, in order to take the place of the conventional programmable microcontroller which is typical used in notebook computer designs. The embedded control unit includes a plurality of peripheral controllers, so as to control various peripheral devices usually used by notebook computers. With the respective settings of the non-adjustable internal registers, the peripheral controllers can be directly connected to the peripheral devices, according to the various different notebook computer design specifications.

In this way, the development process of the embedded controller is simplified by using an integrated circuit implementing a state machine to replace the conventional embedded controller that includes a microcontroller with an internal memory. Conventionally, the microcontroller is required to be programmed by firmware programmers, wherein firmware programmers are required to write source code for peripheral control in high-level computer language, and then the source code is complied into machine code and finally burned into the microcontroller's memory that is installed either internally or externally. As a result, the invention enables reduced complexity of notebook computer product and a reduced period for developing and testing firmware as well as reduced hardware costs.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 2:
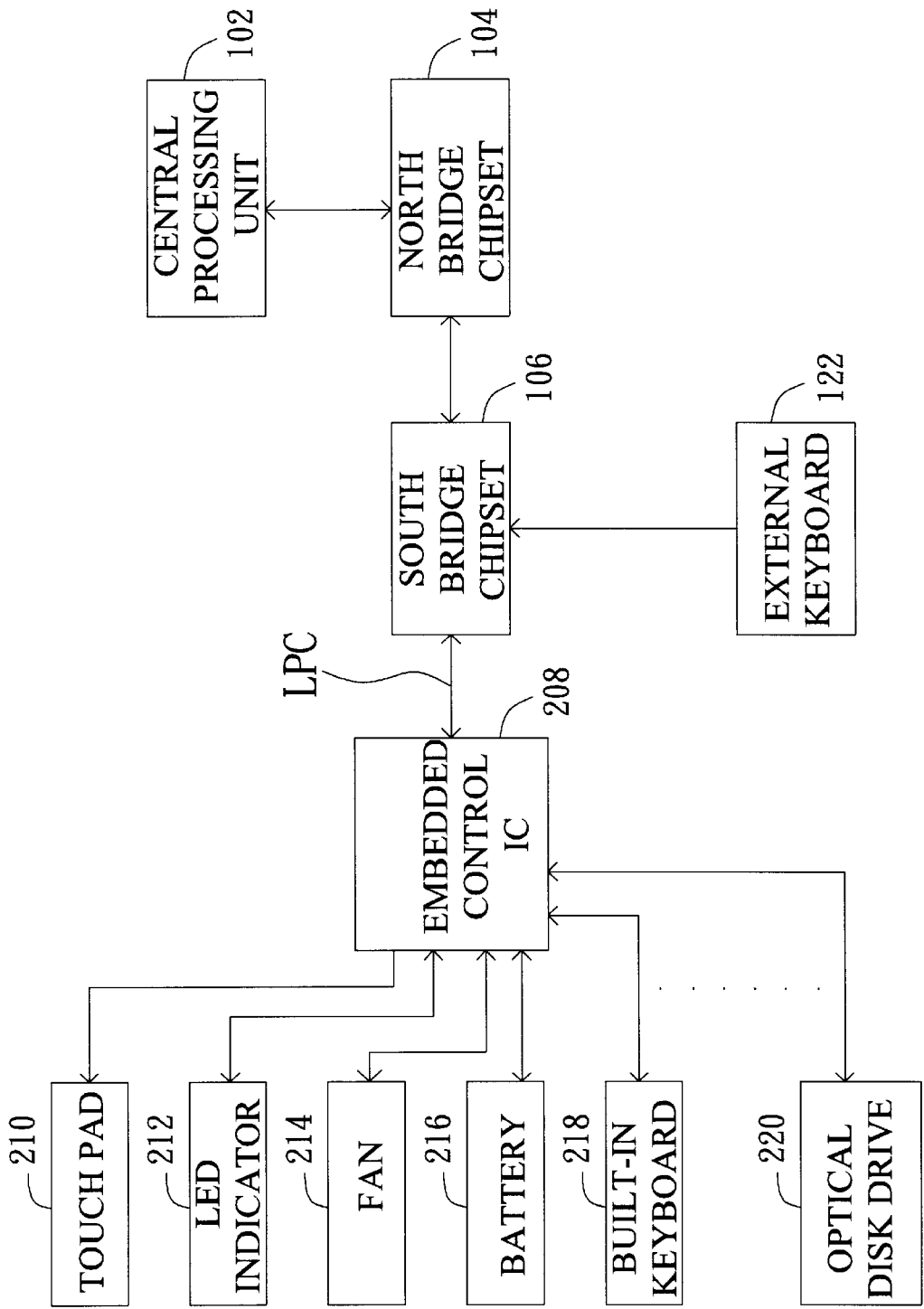
FIG. 2 illustrates the structure of a notebook computer system with a conventional embedded control IC.
Figure 3:
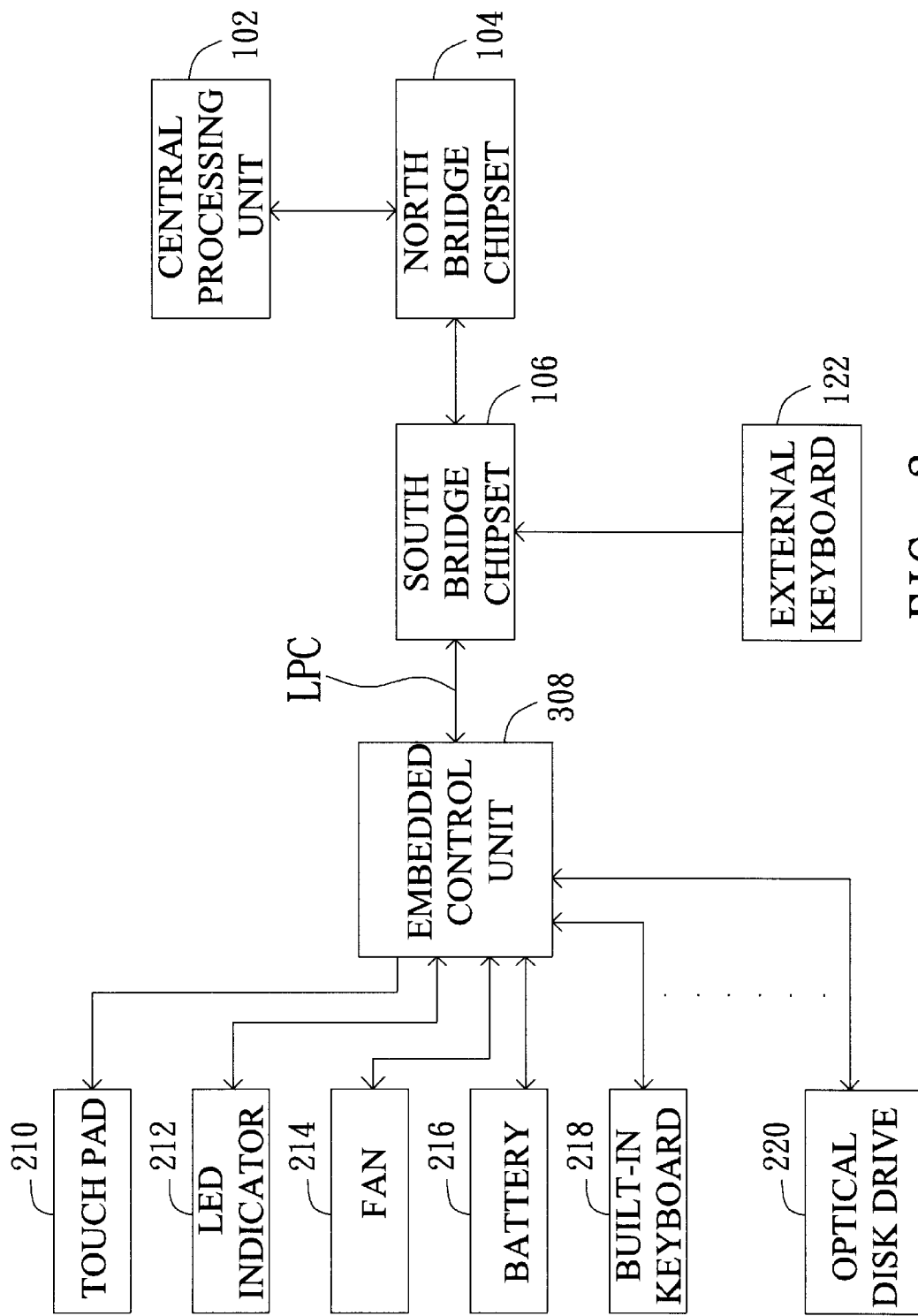
FIG. 3 illustrates the structure of a notebook computer system with an embedded control unit according to the invention.
Figure 4:
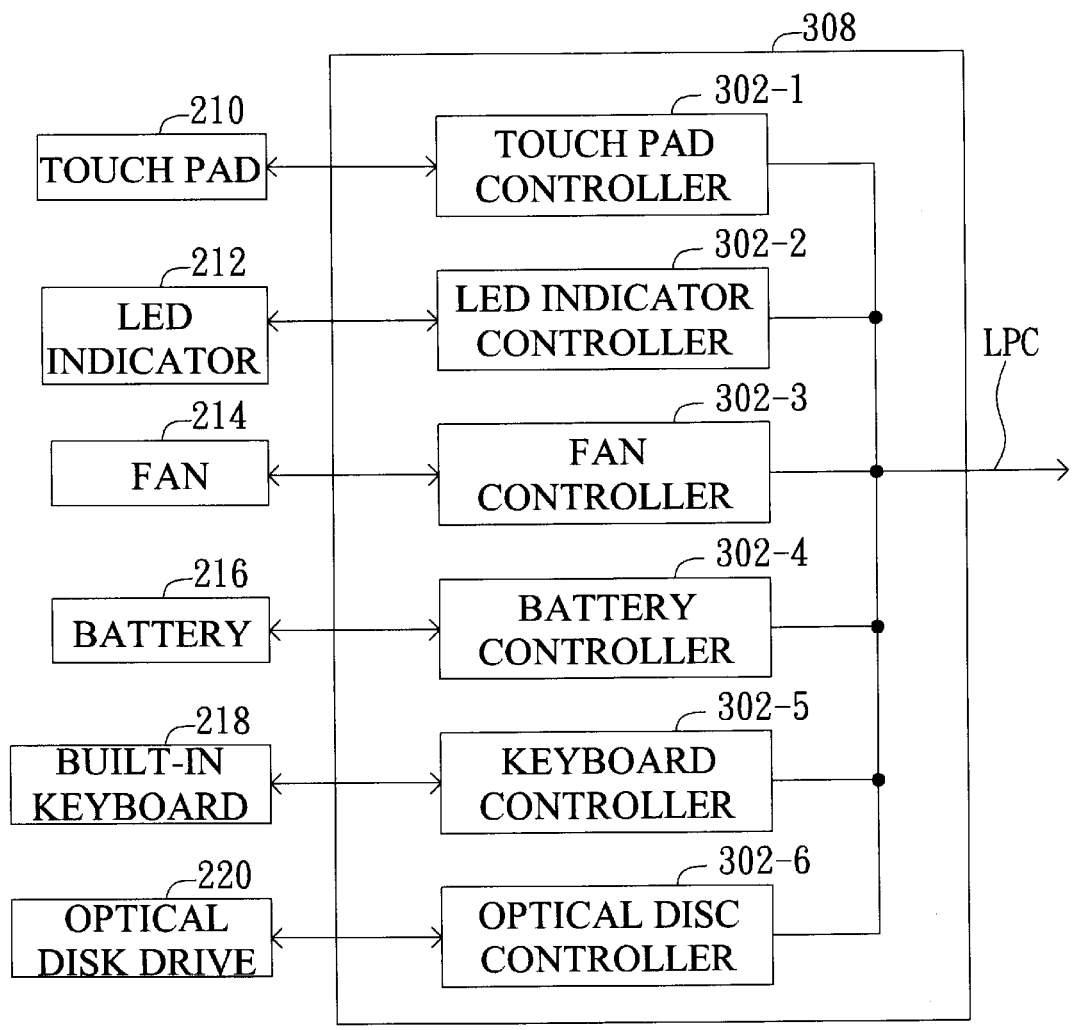
FIG. 4 illustrates a structure of an embedded control unit according to a preferred embodiment of the invention.

Referring to FIG. 3, the structure of a notebook computer system with an embedded control unit is shown according to the invention in block diagram form. This structure is distinguished from the typical notebook computer system shown in FIG. 2 by the embedded control unit 308 which is implemented by a less expensive programmable logic circuit serving as a fully-functional expandable state machine. A structure of the embedded control unit 308 is schematically illustrated in FIG. 4 according to a preferred embodiment of the invention, wherein the embedded control unit 308 includes a plurality of peripheral controllers. The peripheral controllers provide respective control functions capable of controlling different peripheral devices supporting notebook computer manufacturers' various designs. These peripheral controllers can be enabled individually according to the notebook computer manufacturers' design specifications by using a selection signal. In this embodiment, the embedded control unit 308 includes the peripheral controllers such as a touch pad controller 302-1, an LED indicator controller 302-2, a fan controller 302-3, a battery controller 302-4, a keyboard controller 302-5, and an optical disc controller 302-6. The touch pad controller 302-1 is used for monitoring the touch point coordinates on the touch pad 210. The touch point coordinates which correspond to the movement of the user's fingertip on the touch pad 210 are sent by the touch pad 210 via a system management bus (SMBus), for example. On receiving the touch point coordinates, the touch pad controller 302-1 sends them to the south bridge chipset through an LPC interface or a PCI bus so that the mouse driver installed in the operating system (OS) of the notebook computer can obtain the touch point coordinates data. In addition, the LED indicator controller 302-2 is used for determining whether to turn on the LED indicator 212 or not. The fan controller 302-3 is employed to monitor the rotation speed of the fan 214. The battery controller 302-4 is used for monitoring the charging status of the battery 216 and the battery use status. The keyboard controller 302-5 is used for monitoring the built-in keyboard 218. The optical disc controller 302-6 is employed to control the optical disc drive 220 to play music in a CD-ROM without the computer booting up. After all of the needed control functions have been designed, the embedded control unit design can be converted into an RTL description. As a result, the embedded control unit can be further built into the south bridge control chipset by integrating such RTL description into the circuit design of the south bridge chipset, thereby efficiently achieving desirable design integration.

The conventional embedded control unit includes a microcontroller for controlling the built-in peripheral devices of the computer. The embedded control unit 208 of the invention is implemented by using field programmable gate array (FPGA) technology. Regarding the implementation of the peripheral controllers, corresponding hardware designs that are well known in the art can be employed. As a result, a hardware designer of the embedded control unit can complete the embedded control unit design very effectively by only defining the embedded control unit's pin layout. In the following description, a keyboard controller and an optical disc drive controller are taken for example.

Figure 5:
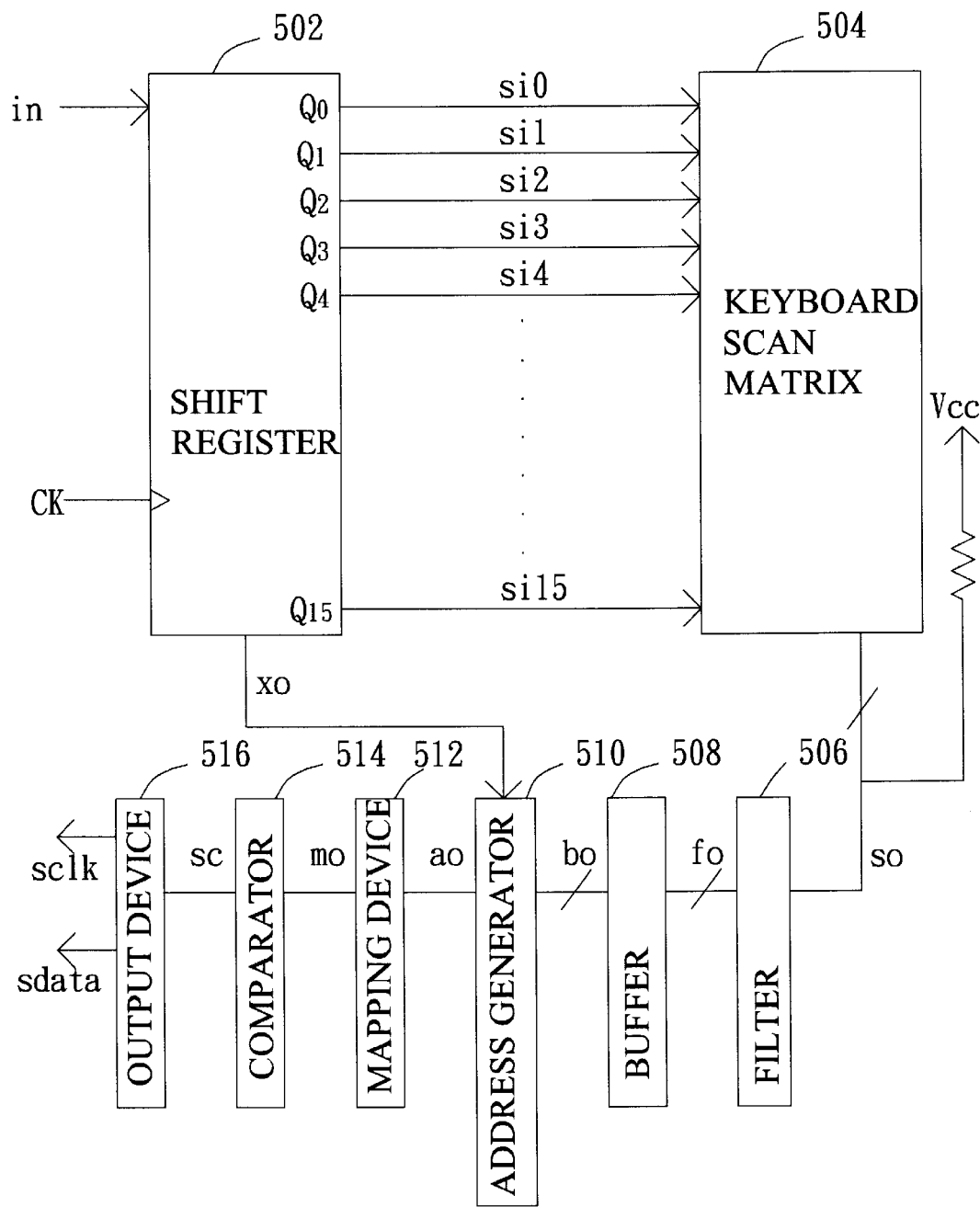
FIG. 5 illustrates the structure of a conventional keyboard controller.

FIG. 5 schematically illustrates the structure of a conventional keyboard controller 302-5. The keyboard controller 302-5 is composed of a shift register 502, a keyboard scan matrix 504, a filter 506, a buffer 508, an address generator 510, a mapping device 512, a comparator 514, and an output device 516. Since notebook computer keyboards of different manufacturers have their individual key layouts, the circuit connections inside the keyboard scan matrix 504 for different keyboards will be different, depending on the keyboards' specifications. As a result, the mapping device 512 maps defined instructions onto the circuit connections which are associated with addresses in the keyboard scan matrix 504 differently depending on respective manufacturers' specifications. The mapping device 512 can be a programmable nonvolatile memory that is programmed by erasing and then burning such mapping into the nonvolatile memory. The comparator 514 is designed to have a number of state registers for respectively storing the states of Caps Lock key, Num Lock key, Alt key, Fn key, Shift key, and so on. On receiving a corresponding signal mo from the mapping device 512, the comparator 514 determines which one of the instructions should be output from the keyboard controller 302-5 according to the corresponding signal mo and the states of the specific function keys stored in the state registers. The output device 516, according to the comparison signal sc, serially outputs a clock signal sclk and a data signal sdata. At this point, the keyboard controller 302-5 then accomplishes the procedure for identifying which key is pressed by the user and producing an instruction signal.

Figure 6:
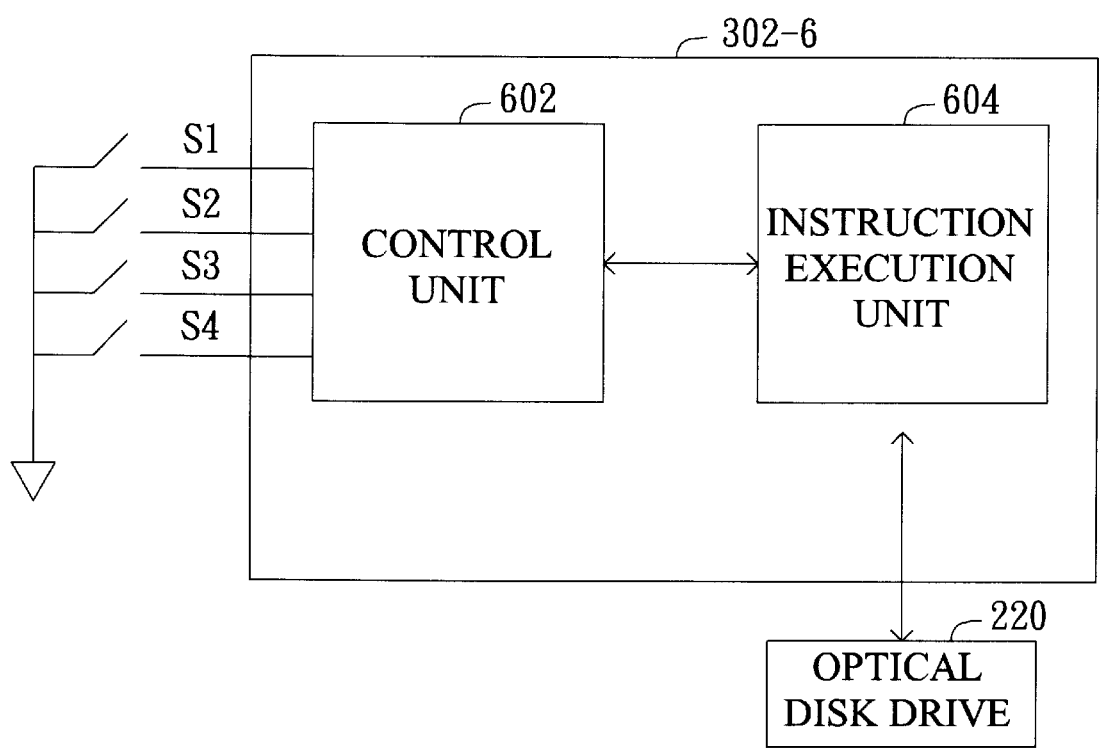
FIG. 6 illustrates the structure of a conventional optical disc drive controller.

FIG. 6 is a schematic diagram illustrating the structure of a conventional optical disc drive controller. The optical disc drive controller 302-6 includes a control unit 602 and an instruction execution unit 604 so as to play CD music via the optical disc drive 220 without the computer booting up. The control unit 602 receives the signals corresponding to the on/off states of the external buttons S1, S2, S3, and S4, for example, the play button, the pause button, the next previous song button, and the previous song button. In response to the signals received from the control unit 602, the instruction execution unit 604 converts the received signals into instructions and then outputs the instructions to the optical disc drive 220 so as to control the optical disc drive 220.

Figure 1:
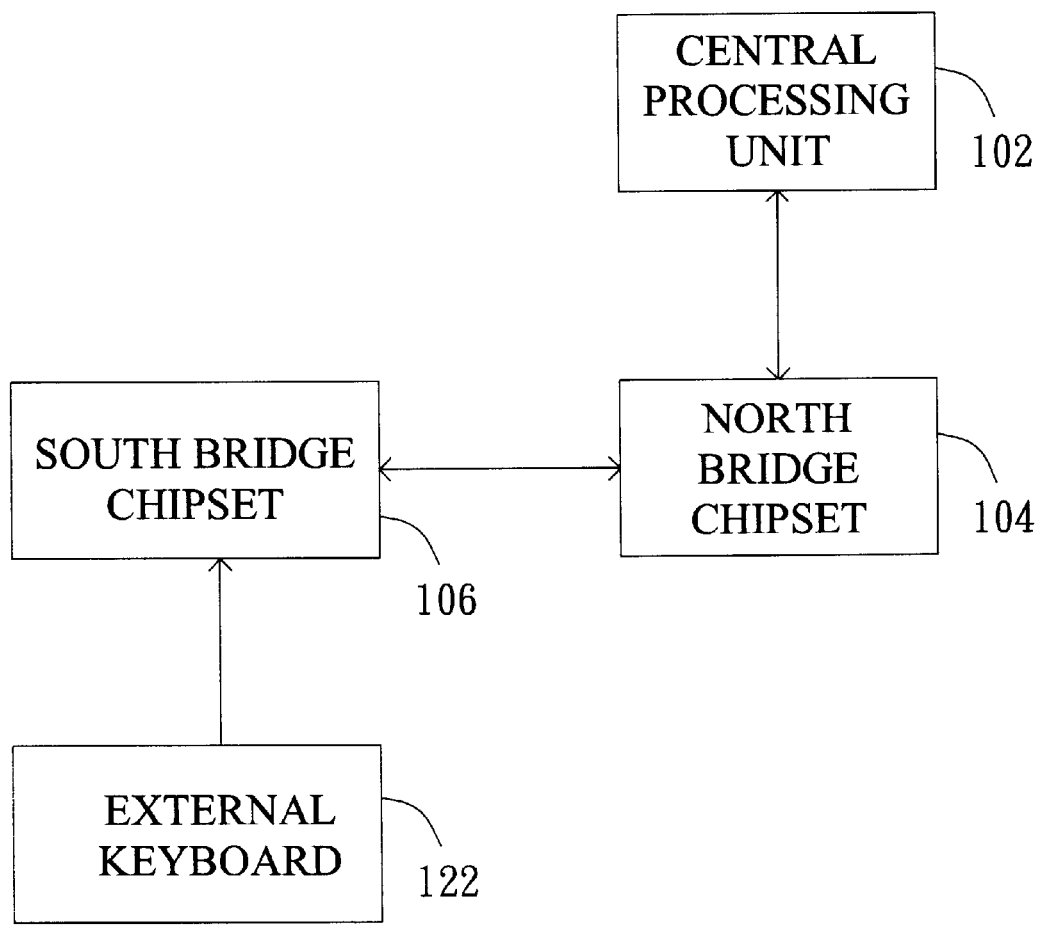
FIG. 1 shows the structure of a typical desktop computer system in block diagram form.
Figure 7:
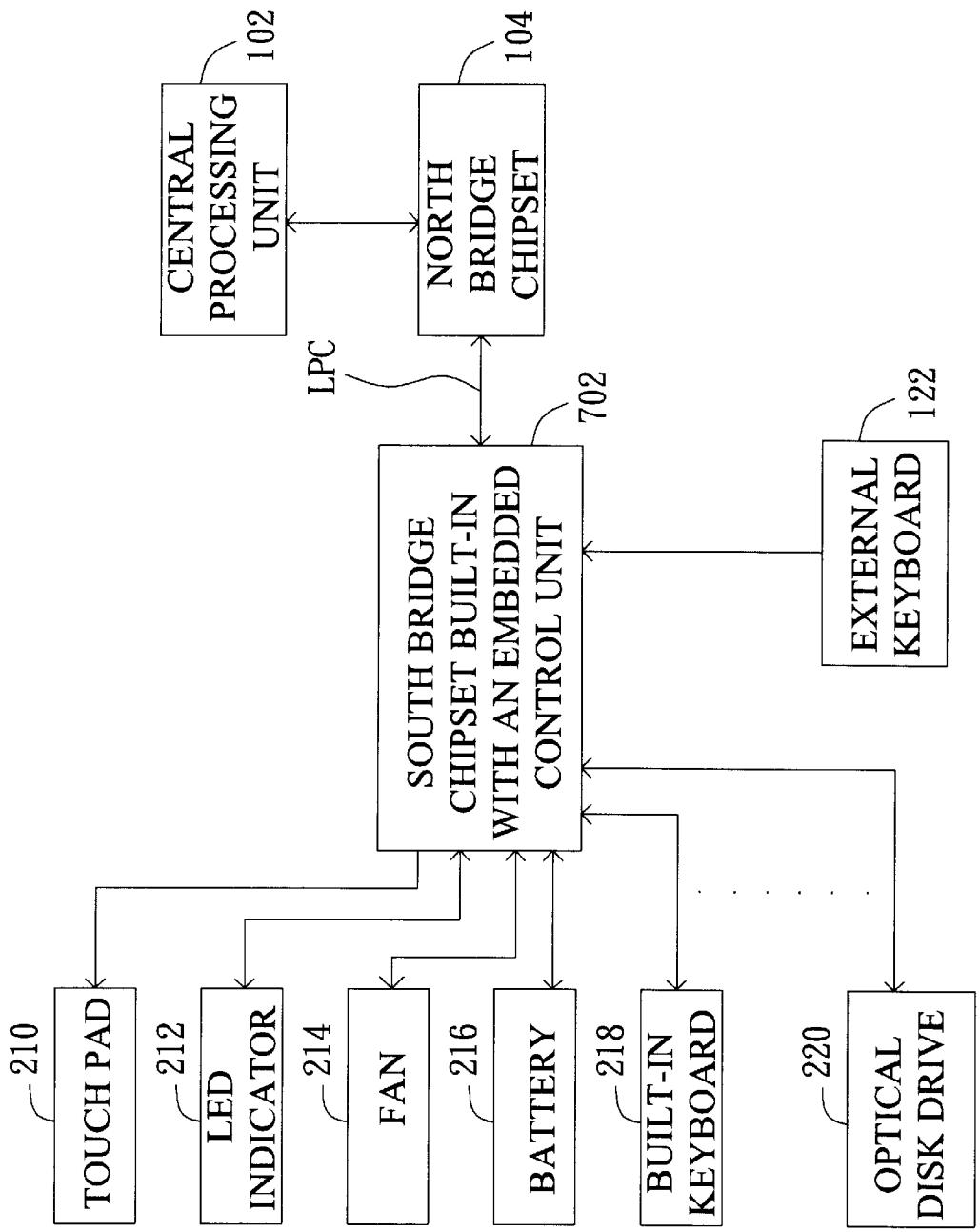
FIG. 7 illustrates a structure of a notebook computer system according to another preferred embodiment of the invention.

In addition, the embedded control unit 308 can be integrated into a south bridge chipset. FIG. 7 illustrates the structure of a notebook computer system using a south bridge chipset that is built-in with an embedded control unit according to another preferred embodiment of the invention. In FIG. 7, the integrated south bridge chipset 702 includes an embedded control unit according to the invention. To be specific, the integrated south bridge chipset 702 includes a core logic unit for communicating with the north bridge chipset 104 and includes the built-in embedded control unit for controlling the peripheral devices such as the touch pad 210, LED indicator 212, and so on. The core logic unit, which is coupled to the bridge chipset 104, can be implemented, for example, by a programming logic circuit or a microprocessor. Referring to FIGS. 3 and 7, the structure of the integrated south bridge chipset 702 can be regarded as the integration of the south bridge chipset 106, i.e. the core logic unit of the integrated south bridge chipset 702, and the embedded control unit 308, i.e. the built-in embedded control unit of the integrated south bridge chipset 702, wherein the core logic unit and the built-in embedded control unit are coupled using internal interconnect lines other than LPC. In this way, the integrated south bridge chipset 702 is built-in with the embedded control unit so that the notebook computer structure can be made as flexible as the desktop computer structure shown in FIG. 1 while being capable of adding various peripheral functions to the notebook computer. Thus, development costs can be reduced.

As the preferred embodiments of the invention disclosed above, the embedded control unit can simplify the development process and reduce development costs.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An input/output controller for controlling a plurality of peripheral devices, wherein the input/output controller is capable of being coupled to a south bridge chipset, the input/output controller comprising:

an embedded control unit, including a plurality of peripheral controllers, wherein each of the peripheral controllers is used for controlling one of the peripheral devices.

2. The input/output controller as recited in claim 1, wherein each of the plurality of peripheral controllers is enabled according to a selection signal.

3. The input/output controller as recited in claim 2, wherein the peripheral devices comprise at least one of a touch panel, a display, a fan, a battery, a built-in keyboard, and an optical disc drive.

4. The input/output controller as recited in claim 1, wherein the south bridge chipset comprises a core logic unit for communicating with a north bridge chipset and with the input/output controller.

5. The input/output controller as recited in claim 1, wherein the embedded control unit is implemented by using field programmable gate array (FPGA).

6. The input/output controller as recited in claim 5, wherein the peripheral devices comprise at least one of a touch panel, a display, a fan, a battery, a built-in keyboard, and an optical disc drive.

7. A computer system for controlling a plurality of peripheral devices, the computer system comprising:

a central processing unit;

a north bridge control circuit coupled to the central processing unit;

a south bridge control circuit coupled to the north bridge control circuit; and an embedded control unit, coupled to the south bridge control circuit and the plurality of peripheral devices respectively, wherein the embedded control unit includes a plurality of peripheral controllers for controlling the plurality of peripheral devices.

8. The computer system as recited in claim 7, wherein each of the peripheral controllers can be enabled according to a selection signal.

9. The computer system as recited in claim 8, wherein the peripheral devices comprise at least one of a touch panel, a display, a fan, a battery, a built-in keyboard, and an optical disc drive.

10. The computer system as recited in claim 7, wherein the south bridge control circuit comprises a core logic unit for communicating with the north bridge control circuit and with the embedded control unit.

11. A computer system for controlling a plurality of peripheral devices, the computer system comprising:

a central processing unit;

a north bridge control circuit coupled to the central processing unit; and a south bridge control circuit coupled to the north bridge control circuit, the south bridge control circuit comprising:

an embedded control unit, coupled to the south bridge control circuit and the plurality of peripheral devices respectively, wherein the embedded control unit includes a plurality of peripheral controllers for controlling the plurality of peripheral devices.

12. The computer system as recited in claim 11, wherein each of the peripheral controllers can be enabled according to a selection signal.

13. The computer system as recited in claim 12, wherein the peripheral devices comprise at least one of a touch panel, a display, a fan, a battery, a built-in keyboard, and an optical disc drive.

14. The computer system as recited in claim 11, wherein the south bridge control circuit further comprises a core logic unit for communicating with the north bridge control circuit, and the embedded control unit is coupled to the core logic unit.

15. A south bridge control circuit for controlling a plurality of peripheral devices, the south bridge control circuit comprising:

an embedded control unit, capable of being coupled to the plurality of peripheral devices respectively, the embedded control unit comprising:

a plurality of peripheral controllers for controlling the plurality of peripheral devices.

16. The south bridge control circuit as recited in claim 15, wherein each of the peripheral controllers can be enabled according to a selection signal.

17. The south bridge control circuit as recited in claim 16, wherein the peripheral devices comprise at least one of a touch panel, a display, a fan, a battery, a built-in keyboard, and an optical disc drive.

18. The south bridge control circuit as recited in claim 15, wherein the south bridge control circuit further comprises a core logic unit for communicating with a north bridge control circuit and with the embedded control unit.

* * * * *